(12) United States Patent
Dennis

(10) Patent No.: US 7,254,255 B2
(45) Date of Patent: Aug. 7, 2007

(54) BIOMETRIC SENSOR APPARATUS AND METHODS

(75) Inventor: Carl Dennis, Edinburgh (GB)

(73) Assignee: STMicroelectronics Ltd., Buckinghamshire (GB)

( * ) Notice: Subject to any disclaimer, the term of this patent is extended or adjusted under 35 U.S.C. 154(b) by 809 days.

(21) Appl. No.: 10/412,645

(22) Filed: Apr. 11, 2003

(65) Prior Publication Data
US 2005/0008197 A1    Jan. 13, 2005

(30) Foreign Application Priority Data
Apr. 12, 2002 (EP) .................................. 02252601

(51) Int. Cl.
G06K 9/00    (2006.01)
(52) U.S. Cl. ...................... 382/115; 382/124; 382/125; 382/312
(58) Field of Classification Search ................. 382/312, 382/124, 115–116, 125–127, 274; 356/71
See application file for complete search history.

(56) References Cited

U.S. PATENT DOCUMENTS

| 5,737,439 | A | 4/1998 | Lapsley et al. ............. 382/115 |
| 6,229,908 | B1 * | 5/2001 | Edmonds et al. ........... 382/124 |
| 6,292,576 | B1 * | 9/2001 | Brownlee ................... 382/124 |
| 6,877,097 | B2 * | 4/2005 | Hamid et al. ............... 713/186 |
| 2001/0050765 | A1 * | 12/2001 | Antonelli et al. ............. 356/71 |
| 2002/0097896 | A1 * | 7/2002 | Kuckendahl ................ 382/124 |

\* cited by examiner

*Primary Examiner*—Matthew C. Bella
*Assistant Examiner*—Ali Bayat
(74) *Attorney, Agent, or Firm*—Lisa K. Jorgenson; Allen, Dyer, Doppelt, Milbrath & Gilchrist, P.A.

(57) ABSTRACT

The optical biometric sensor apparatus and methods for analyzing images of biometric features such as fingerprints are adapted to distinguish between live body members and inanimate objects, and to detect spoofing devices applied to live body members. Live body members are detected by transmitting IR light from a first IR light source through an object to an image sensor. The IR transmission characteristics of a live body member vary with the human heartbeat, and multiple images are analyzed to verify whether the object is a genuine live body member. A visible light source illuminates the object for obtaining a detailed image from the sensor for conventional biometric analysis. Transmitted IR images and reflected visible light images are also processed to detect the presence of spoofing devices applied to live body members. Multiple IR and visible light sources of different wavelengths may be used for this purpose.

18 Claims, 1 Drawing Sheet

BIOMETRIC SENSOR APPARATUS AND METHODS

FIELD OF THE INVENTION

The present invention relates to biometric sensors and methods. More particularly, the invention relates to devices and methods using optical imaging of fingerprints, handprints or the like to verify a person's identity, and which are resistant to "spoofing". The invention is particularly concerned with determining whether a finger, hand or the like presented to a biometric imaging device is a live finger, hand etc.

BACKGROUND OF THE INVENTION

To be secure, identification systems need to be robust against fraud; i.e. to ensure that one person cannot pass themselves off as another person.

The field of biometrics relates to the statistical analysis of physiological characteristics. For the purposes of identification for security or other purposes, features such as fingerprints or retinal scans can be used to uniquely identify individuals. Every person has a unique set of fingerprints, and this provides a basis for identification. An image of a fingerprint can be taken and analyzed to see if it matches a recorded sample of the user's fingerprints. This is done by analyzing a number of details, or "minutiae" of the fingerprint. The greater the number of minutiae that are analyzed, the less are the chances of incorrectly identifying an individual.

However, a biometric identification system that relies solely on mathematical analysis of simple optical images can be easily spoofed, as a copy of the pattern of a fingerprint can be easily made and presented to a reader device. Accordingly, systems have been developed to identify whether the finger to be identified is indeed a three-dimensional finger, rather than just a photocopy or the like. Such a system is disclosed in U.S. Pat. No. 6,292,576 (Brownlee). A finger to be identified is placed on a platen and is illuminated by two light sources. The first light source illuminates the finger from directly below the finger, and a positive image is obtained, and the second light source is positioned at an angle greater than the critical angle so that the beam is subject to frustrated total internal reflection (FTIR) to obtain a negative image. The images can then be added, and if a true finger is present, the two images will cancel each other out, whereas if a spoof is present, the images from the two light sources will reinforce each other.

Such methods using FTIR are well explained in U.S. Pat. No. 6,292,576 and are well known in the art. However, such methods can still be spoofed, for example by rubber models of a finger. Therefore, besides analyzing the details of a fingerprint, it is desirable for a biometric identification system to verify the presence of a live finger (or other relevant body member). International Patent Publication Number WO 01/24700 gives some examples of such techniques. In this case, the ridges of the fingerprint act as one plate of a capacitor. Properties of a live finger such as perspiration, warmth, and pressure, mean that the conductivity of the ridges will change, thus affecting the capacitance. Thus, a finger can be tested with solid state capacitive sensors to see if it has the electrostatic properties that are characteristic of a live finger.

Such methods and other examples of biometric identification are well known in the art. However, they are expensive to implement. There is a need for a live finger detection apparatus that is robust against spoofing and that can be easily manufactured, installed and used.

SUMMARY OF THE INVENTION

The present invention provides a biometric sensor apparatus and methods using optical imaging of a body member such as a finger, hand or palm, and adapted to identify a live body member. As used herein, "optical image sensors" means sensors that are responsive to electromagnetic radiation at least in the visible and infra red (IR) or near-IR spectra. Hereafter, references to IR include near-IR.

BRIEF DESCRIPTION OF THE DRAWINGS

The present invention will now be described, by way of example only, with reference to the accompanying drawing, in which.

DETAILED DESCRIPTION OF THE PREFERRED EMBODIMENTS

Figure 1:
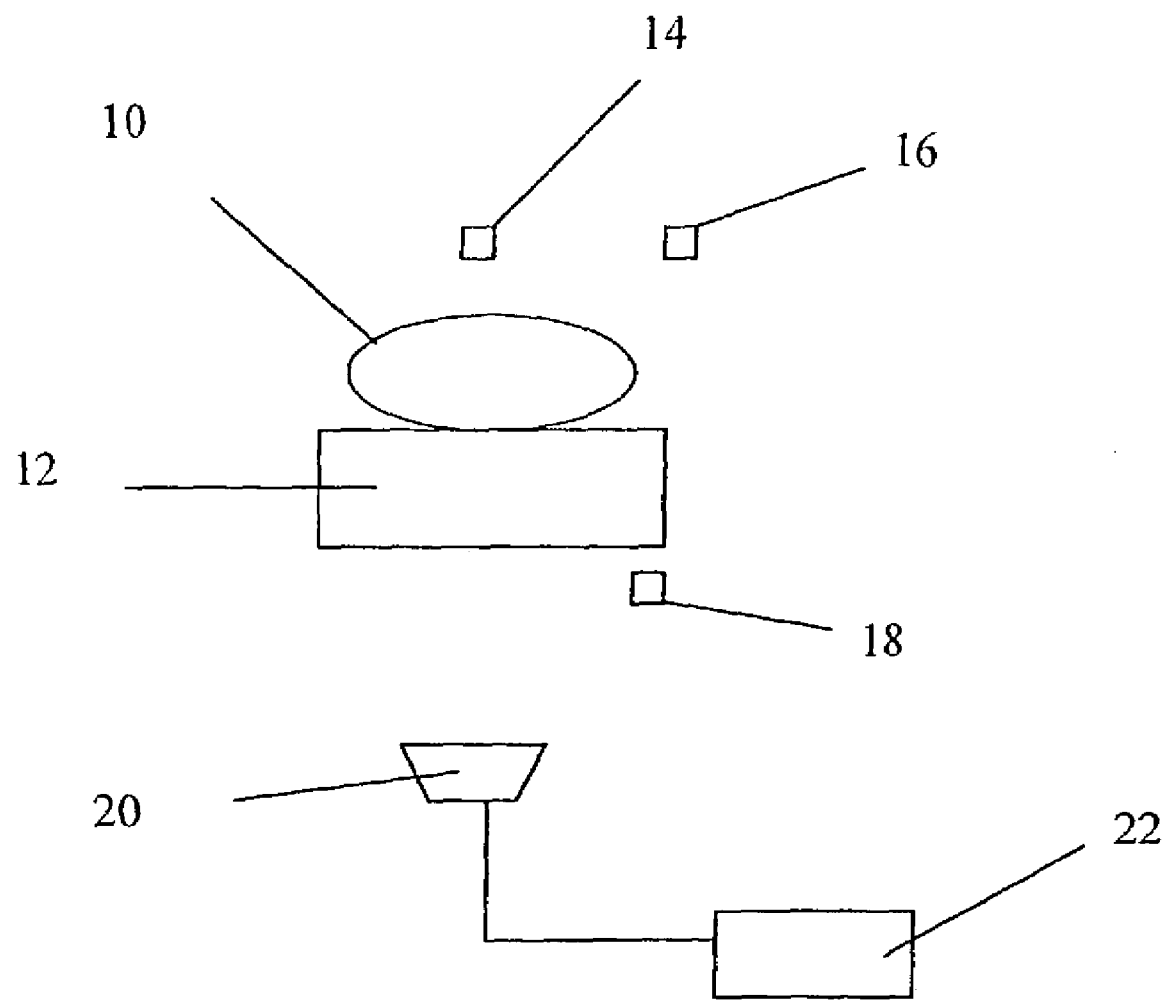
FIG. 1 is a block diagram schematically illustrating an embodiment of a biometric sensor apparatus in accordance with the invention.

The invention will be described in relation to systems for biometric identification based on fingerprints, but is also applicable to identification based on unique characteristics of other body members, particularly hand or palm prints.

As shown in FIG. 1, a preferred embodiment of a biometric identification system in accordance with the invention is adapted to read and analyze a fingerprint of a fingertip 10 placed in contact with a translucent platen 12. It will be evident to those skilled in the art that in this context the term "translucent" includes the case where the platen 12 is in fact transparent. At least a first and preferably first and second IR illumination sources 14 and 16, suitably light emitting diodes (LEDs), are arranged above the platen 12 to transmit light of selected frequencies in the IR band through the fingertip 10 and platen 12. At least a first visible illumination source 18, again suitably an LED, is arranged below the platen 12 to transmit visible light through the platen 12 for reflection from the fingertip 10 back through the platen 12.

An optical image sensor 20, suitably a solid state image sensor such as a CCD or, most preferably, a CMOS device, is arranged below the platen 12 to receive transmitted light from the first and second IR LEDs 14 and 16 and reflected light from the visible LED 18. For the purposes of the present invention, the image sensor 20 is suitably a monochromatic (grayscale) sensor, rather than a color sensor. One or more lenses or the like (not shown) may be provided between the platen 12 and the sensor 20 as required. The sensor 20 is connected to data storage and processing means 22 for storing and processing signals received from the sensor 20.

As shall be described in more detail below, the first IR LED 14 is used in combination with the sensor 20 for live finger detection in accordance with the invention. The visible LED 18 is used in combination with the sensor 20 for obtaining a detailed image of a fingerprint for biometric identification, in a manner that is well known in the art. In accordance with further aspects of the invention, the first and/or second IR LEDs 14 and 16 are used in combination with the visible LED 18 and sensor 20 to provide additional protection against spoofing; e.g. by a fake fingerprint applied to a live fingertip.

As noted above, the first IR LED 14 is used in determining whether the fingertip 10 is a live finger, and not a spoofing device such as an imitation finger. For this purpose, the invention employs principles used in the medical field of pulse oximetry. The tissues of a body member such as a fingertip are almost transparent to IR light. However, blood absorbs IR light. This phenomenon is exploited in pulse oximetry for a variety of clinical purposes, including the detection of heart rate, the sinus rhythm of the heart beat, the presence of blood vessels and the percentage of dissolved oxygen in the bloodstream. The present invention applies such techniques in a simplified form for biometric purposes, to detect characteristics of a beating human heart that are present in a live finger but absent in a spoofing device.

During the pulsatile phase of a heart beat, blood flows through the arteries of a finger, causing them to dilate, while other parts of the finger, such as the tissue and bone, and the venous blood vessels do not change in diameter. Therefore, the intensity of transmitted light will vary between the pulsatile phase and non-pulsatile phase as a result of the blood flow. This difference in intensity of transmitted light can form the basis for forming an image of the blood vessels in a finger and for gathering information about the blood flow in these vessels. The intensity will vary according to the Lambert-Beer law, which states that the intensity of a beam of monochromatic radiation varies exponentially with the medium's thickness.

A pulse oximeter is designed to calculate the respective levels of various types of hemoglobin in the blood, based on the different absorption coefficients of oxygenated and de-oxygenated blood. However, the present invention is not concerned with making such detailed measurements, as it merely needs to detect the presence of a live finger.

As shown in FIG. 1, a finger 10 to be identified is placed on a transparent platen 12. First IR LED 14 transmits light at a selected IR wavelength. The choice of wavelength is limited by the transmission characteristics of the fingertip and the sensitivity of the sensor 20. The minimum wavelength that is usefully transmitted through a fingertip is about 700 nm. The maximum wavelength detectable by a conventional optical CMOS sensor is about 1100 nm. Conventional, nominally monochromatic LEDs typically have a bandwidth of the order of 20 to 50 nm. In this preferred embodiment, a monochromatic LED having a nominal wavelength of 850 nm is suitable, but LEDs having nominal wavelengths up to 1100 nm may be used. Higher wavelengths could be used with specialized sensors. However, for the purposes of the present invention it is preferable to use a wavelength that is detectable by a conventional image sensor, which is also employed for obtaining the detailed fingerprint image for biometric identification.

For the purpose of live finger detection, at least two transmitted IR images are required for comparison with one another, to detect a pulse. For practical purposes it desirable to capture a larger number of images over a period of time determined by typical human heart rates, so as to obtain sufficient data to verify the existence of a genuine human pulse waveform. In the preferred embodiment, the pulse data obtained from the IR images are analyzed to make sure that the waveform corresponds to a typical sinus waveform indicative of a human heart beat, and then the period of the heart beat is measured, to see if it falls into a predetermined range of typical human heart beats. To accomplish this, the data must be sampled at an adequate rate, preferably of the order of five to ten times the Nyquist frequency for the highest frequency component of a typical heart beat. Therefore, the sensor 20 might be required to process hundreds or thousands of frames of information per second.

A typical image sensor 20 for obtaining a detailed fingerprint image for biometric identification may have a pixel array typically comprising anything between 50,000 and 300,000 pixels. However, for the purposes of live finger detection in accordance with the present invention, it is only necessary to capture and process data from a small proportion of these pixels. For example, data may be collected from a window of about sixty-four pixels for each frame. The data value measured for each frame could be the average of the data value for each of the sixty-four pixels. This facilitates the high sampling rate referred to above.

The live finger detection described thus far protects an optical fingerprint reader against spoofing by inanimate objects or images, in accordance with one aspect of the invention. The visible LED 18 and sensor 20 are used firstly to obtain detailed fingerprint images for biometric identification in a manner that is well known in the art and which will not be described in detail herein. In accordance with a further aspect of the invention, the visible LED 18 is also used in combination with the first and/or second IR LEDs 14 and 16 and the sensor 20 to provide further protection against spoofing by imitation fingerprints applied to live fingertips, as shall now be described.

In accordance with this further aspect of the invention, images obtained by one or more IR light sources in transmission mode (through the fingertip) are compared with images obtained by one or more visible light sources in reflection mode (from the fingertip) to determine whether they are consistent with a genuine finger or whether they indicate the presence of a spoofing device.

In a similar manner to the above-described embodiment of the invention, data may be collected from a window of about sixty-four pixels for each frame, in order to facilitate the high sampling rate referred to above. A frame of data, or several frames averaged to reduce noise, is acquired under each illuminant. The human finger transmits and reflects light in well recognized proportions, giving it a particular "color" defined by the intensity of the measured pixels. A spoofing device that is not itself made of flesh will not have this characteristic color.

Where multiple IR light sources are used, it is preferred that these should emit light in non-overlapping IR wavebands, within the limits discussed above for the first IR LED 14. However, partially overlapping IR wavebands may be used, as long as the two signals are distinguishable. Similarly, where multiple visible light sources are used, these should emit light in non-overlapping visible wavebands (typically within the range 380-780 nm). However, partially overlapping wavebands could be used as long as they are distinguishable.

The use of more IR and/or visible light sources provides more data at different wavelengths, improving the reliability of the system. However, it is desirable to minimize the number of light sources to minimize the cost and complexity of the system. As a minimum, one IR and one visible light source are required to provide live finger detection and additional anti-spoofing functions together with biometric identification. The addition of a second IR source 16 improves robustness at minimal additional cost. Where the first IR LED has a wavelength of 850 nm, as described above, the second IR LED 16 might suitably have a wavelength of 750 nm.

In use, the system would preferably perform live finger detection as a first step. If this test is passed, the secondary anti-spoofing test would be performed. Only once both these tests had been passed would the system perform full biometric analysis of the detailed fingerprint image. The data storage and processing means 22 may comprise any suitable types of memory and processor, located locally to or remote from the light sources and sensor. If they are located locally, they may be integrated into the same IC as the sensor 20 or be provided on a PCB shared with the sensor.

Improvements and modifications may be incorporated without departing from the scope of the invention as defined in the appended claims.

That which is claimed is:

1. A biometric sensor device comprising:
a translucent platen having a first side against which a body member to be analyzed is placed, and a second side;
at least one infrared (IR) light source located adjacent the first side of the translucent platen for transmitting IR light through the body member and the translucent platen to the second side of the translucent platen;
an optical image sensor located adjacent the second side of the translucent platen for detecting IR light transmitted through the body member and the translucent platen; and
data storage and processing means for storing and processing signals output from the optical image sensor;
data storage and data processing means being adapted to store and process a plurality of images obtained from the optical image sensor in response to IR light transmitted from the IR light source through an object placed on the translucent platen to determine whether the object is a live body member, the data processing means being adapted to analyze relative intensities of the plurality of images to determine whether variations in those intensities are consistent with characteristics indicative of a human heartbeat.

2. The device of claim 1, further comprising at least one visible light source located adjacent the second side of the translucent platen and arranged so that visible light from the visible light source is transmitted through the translucent platen and reflected by the body member for detection by the optical image sensor.

3. The device of claim 1, further comprising at least one visible light source located adjacent the second side of the translucent platen and arranged so that visible light from the visible light source is transmitted through the translucent platen and reflected by the body member for detection by the optical image sensor; and wherein the data storage and processing means is adapted to process at least one image obtained from the optical image sensor in response to IR light transmitted from the IR light source through a live body member placed on the translucent platen and at least one image obtained from the optical image sensor in response to visible light from the visible light source reflected from the live body member placed on the translucent platen so as to determine the presence or absence of a spoofing device associated with the live body member.

4. The device of claim 1, wherein the at least one IR light source comprises a plurality of IR light sources for transmitting IR light through the body member, each of the ER light sources emitting IR light in a different waveband.

5. The device of claim 4, wherein each IR light source emits IR light in a waveband in the range 700 rim to 1100 rim.

6. The device of claim 5, wherein a first IR light source of the plurality of IR light sources emits IR light with a wavelength of 850 nm.

7. The device of claim 6, wherein a second IR light source of the plurality of IR light sources emits IR light with a wavelength of 750 nm.

8. The device of claim 1, further comprising a plurality of visible light sources located adjacent the second side of the platen and arranged so that visible light from the visible light sources is transmitted through the translucent platen and reflected by the body member for detection by the optical image sensor, each of the visible light sources emitting visible light in a different waveband.

9. The device of claim 1, wherein the optical image sensor comprises a CMOS image sensor.

10. A biometric sensor device comprising:
a platen having a sensing portion to receive a body member;
at least one infrared (IR) light source located adjacent the sensing portion for transmitting IR light through the body member;
an optical image sensor located opposite the sensing portion for detecting IR light transmitted through the body member; and
a memory and processor cooperating therewith for storing and processing signals output from said optical image sensor;
said memory and processor cooperating for storing and processing a plurality of images obtained from said optical image sensor in response to IR light transmitted from said IR light source through an object placed on said platen to determine whether the object is a live body member, said memory and processor cooperating for analyzing relative intensities of the plurality of images to determine whether variations in those intensities are consistent with characteristics indicative of a human heartbeat.

11. The device of claim 10, further comprising at least one visible light source located opposite the sensing portion to transmit visible light through said platen and reflected by the body member for detection by said optical image sensor.

12. The device of claim 10, further comprising at least one visible light source located opposite the sensing portion to transmit visible light through said platen and reflected by the body member for detection by said optical image sensor; and wherein said memory and processor cooperate for processing at least one image obtained from said optical image sensor in response to IR light transmitted from said IR light source through a live body member placed on said platen and at least one image obtained from said optical image sensor in response to visible light from the visible light source reflected from the live body member placed on said platen to determine the presence or absence of a spoofing device associated with the live body member.

13. The device of claim 10, wherein said optical image sensor comprises a CMOS image sensor.

14. A method for determining whether an object presented to a biometric sensor device is a live body member, the method comprising:
transmitting IR light from an IR light source through the object;
detecting IR light transmitted through the object using an optical image sensor;
obtaining a plurality of images from the optical image sensor in response to IR transmitted from the IR light source through the object; and
processing the images to determine whether the object has characteristics of a live body member by analyzing relative intensities of the plurality of images to determine whether variations in those intensities are consistent with characteristics indicative of a human heartbeat.

15. A method of determining whether a live body member presented to a biometric sensor device has a spoofing device associated therewith, the method comprising:
   transmitting IR light from at least one IR light source through the body member;
   detecting IR light transmitted through the body member using an optical image sensor;
   obtaining at least one image from the optical image sensor in response to IR light transmitted from the IR light source through the body member;
   reflecting visible light from at least one visible light source from the body member;
   detecting visible light reflected from the body member using the optical image sensor;
   obtaining at least one image from the optical image sensor in response to visible light from the visible light source reflected from the body member; and
   processing the images determine the presence or absence of a spoofing device associated with the body member by analyzing relative intensities of the images to determine whether variations in those intensities are consistent with characteristics indicative of a human heartbeat.

16. A method of operating a biometric sensor device comprising:
   placing a body member on a sensing portion of a platen;
   transmitting IR light through the body member with at least one infrared (IR) light source located adjacent the sensing portion;
   detecting IR light transmitted through the body member with an optical image sensor located opposite the sensing portion; and
   storing and processing signals output from the optical image sensor by
      processing a plurality of images obtained from the optical image sensor in response to IR light transmitted from the IR light source through an object placed on the platen to determine whether the object is a live body member, and
      analyzing relative intensities of the plurality of images to determine whether variations in those intensities are consistent with characteristics indicative of a human heartbeat.

17. The method of claim 16, further comprising transmitting visible light through the platen and reflected by the body member with at least one visible light source located opposite the sensing portion for detection by the optical image sensor.

18. The method of claim 16, further comprising transmitting visible light through the platen and reflected by the body member with at least one visible light source located opposite the sensing portion for detection by the optical image sensor; and wherein storing and processing comprises processing at least one image obtained from the optical image sensor in response to IR light transmitted from the IR light source through a live body member placed on the platen and at least one image obtained from the optical image sensor in response to visible light from the visible light source reflected from the live body member placed on the platen to determine the presence or absence of a spoofing device associated with the live body member.

* * * * *

UNITED STATES PATENT AND TRADEMARK OFFICE
CERTIFICATE OF CORRECTION

PATENT NO. : 7,254,255 B2  Page 1 of 1
APPLICATION NO. : 10/412645
DATED : August 7, 2007
INVENTOR(S) : Dennis It is certified that error appears in the above-identified patent and that said Letters Patent is hereby corrected as shown below:

Cover Page, Section 75    Delete: "Edinburgh (GB)"
                          Insert -- Edinburgh, Scotland (GB) --

Column 5, Line 60         Delete: "ER"
                          Insert -- IR --

Column 5, Line 63         Delete: "rim"
                          Insert -- nm --

Column 5, Line 64         Delete: "rim"
                          Insert -- nm --

Column 6, Line 63         Delete: "IR transmitted"
                          Insert -- IR light transmitted --

Signed and Sealed this

Eleventh Day of March, 2008

JON W. DUDAS
*Director of the United States Patent and Trademark Office*